(12) United States Patent
Battermann et al.

(10) Patent No.: US 6,264,235 B1
(45) Date of Patent: Jul. 24, 2001

(54) STEERING WHEEL WITH AN AIRBAG MODULE

(75) Inventors: Jens Battermann; Sami Al Samarae; Martin Kamm, all of Berlin; Stefan Reh, Wörth am Main; Heinz-Dieter Adomeit, Berlin, all of (DE)

(73) Assignee: Petri AG (DE)

( * ) Notice: Subject to any disclaimer, the term of this patent is extended or adjusted under 35 U.S.C. 154(b) by 0 days.

(21) Appl. No.: 09/402,409

(22) PCT Filed: Mar. 27, 1998

(86) PCT No.: PCT/DE98/00922

§ 371 Date: Oct. 4, 1999

§ 102(e) Date: Oct. 4, 1999

(87) PCT Pub. No.: WO98/45145

PCT Pub. Date: Oct. 15, 1998

(30) Foreign Application Priority Data

Apr. 3, 1997 (DE) .............................................. 197 14 898

(51) Int. Cl.[7] .............................. B60R 21/22; B60R 21/20
(52) U.S. Cl. .............................................................. 280/731
(58) Field of Search ................................................ 280/731

(56) References Cited

U.S. PATENT DOCUMENTS

| | | | |
|---|---|---|---|
| 3,322,386 | 5/1967 | Kunkle, Jr. | 248/206 |
| 3,801,123 | 4/1974 | Jira | 280/87 R |
| 4,709,944 | 12/1987 | Hongo et al. | 280/777 |
| 5,507,521 | 4/1996 | Steffens, Jr. | 280/775 |

FOREIGN PATENT DOCUMENTS

| | | |
|---|---|---|
| 26 25 184 A1 | 12/1977 | (DE) . |
| 34 13 009 A1 | 10/1985 | (DE) . |
| 37 26 336 A1 | 2/1989 | (DE) . |
| 196 07 193 A1 | 9/1996 | (DE) . |
| 297 02 441 U1 | 7/1997 | (DE) . |
| 7-40800 | 2/1995 | (JP) . |

Primary Examiner—Kenneth R. Rice
(74) Attorney, Agent, or Firm—Foley & Lardner

(57) ABSTRACT

The invention relates to a steering wheel having a nave, spokes, a rim and an air bag module. According to the invention, a rotationally arranged component (11) is secured to the steering wheel nave (2, 3) or to the steering column allocated thereto, which is designed to accommodate at least one further subassembly. The center of gravity of said component (11) and/or the other subassembly is positioned so eccentrically that the rotationally arranged component (11) remains in the same position when the steering wheel is rotated as when it is straightened. The advantage of the inventive steering wheel is that the subassembly connected to the rotationally arranged component, e.g. an air bag, does not change its position either when the steering wheel is rotated.

19 Claims, 4 Drawing Sheets

STEERING WHEEL WITH AN AIRBAG MODULE

BACKGROUND OF THE INVENTION

The invention relates generally to a steering wheel having a hub, spokes, a steering wheel rim, and an airbag module.

Steering wheels of motor vehicles are generally fitted with an airbag for the protection of the occupant in the event of a crash. The airbag is thereby mounted rigid or movable in an airbag module in the center of the steering wheel relative to the longitudinal axis of the steering column. This driver airbag has a symmetrical shape in the inflated state so that it is active in the same way irrespective of the rotary position of the steering wheel.

The drawback with the known driver airbag is that the symmetrical shape does not offer optimum protection for the occupant. An asymmetric shape could indeed improve the protection when the steering wheel is in a certain position, e.g. when set up straight. In other positions of the steering wheel, an asymmetrical position would impair protection compared with a symmetrical airbag.

A further drawback is that the airbag unfolds inclined upwards in the event of a crash depending on the angle of the steering column. The airbag thereby does not act with its entire surface area evenly on the body of the occupant but certain areas of the body suffer greater impact. To avoid this disadvantage it is known from DE 196 07 193 A1 to tilt the steering wheel downwards. The steering wheel is thereby fixed for articulated movement in the upper area of the hub and in the event of a crash can be turned away downwards through a pyrotechnic device. The plane of the steering wheel rim is thereby set approximately parallel to the body of the occupant. The airbag then unfolds in a direction which is approximately the horizontal direction and the airbag forces act more uniformly on the driver. At the same time the risk of injury through the lower area of the steering wheel rim is also reduced.

The drawback with this tilting steering wheel is that a pyrotechnic device with associated electronics is required to tilt the steering wheel in the event of a crash.

The object of the invention is to change the steering wheel so that improved protection of the occupant is possible independently of the position of the steering wheel and without the expense of extra measures.

SUMMARY OF THE INVENTION

With a steering wheel having a hub, spokes, a steering wheel rim and an airbag module, according to the present invention a rotary mounted component part for holding at least a further subassembly is fixed on the steering wheel hub or in the associated steering column. The center of gravity of the component part and/or the additional subassembly lies eccentric so that during rotation of the steering wheel the rotary mounted component part remains in the same position that it occupies when the steering wheel is straight. The rotary axis of the rotary mounted component part preferably coincides with the longitudinal axis of the steering column holding the steering wheel. The center of gravity of the rotatable component part therefore lies underneath the upwardly inclined longitudinal axis and also remains there during rotation of the steering wheel.

This steering wheel according to the present invention contains a sub-assembly which does not rotate with the steering wheel. Thus new possibilities are disclosed for increasing the safety of the driver in the event of a crash.

In a first embodiment, a weight with a circular base surface is mounted on the rotatably mounted component part and its center of gravity lies outside of the rotary axis. This position of the center of gravity can be achieved, for example, by an outwardly extending expansion on one side of the weight or by a section of smaller diameter. The weight can, however, have any other shape wherein the center of gravity lies outside of the rotary axis of the rotatable component part.

In order to be able to connect subassemblies to the rotary mounted component part for increasing the safety of the driver in the event of a crash [to the rotary mounted component part], it is expedient if the rotary mounted component part and the weight are plate-shaped.

One possibility of using the rotary mounted component part for increasing the safety of the passenger is if a deformation element is provided on and fixed to the rotary mounted component part. The deformation element lies above the rotary axis and extends in the direction of the steering wheel rim. In the event of a crash, the deformation element can be deformed preferably away from the driver by a component part of the steering wheel. This deformation element always remains above the longitudinal axis during rotation of the steering wheel. It has now surprisingly been found that in the event of a crash, a relatively slight deformation of the deformation element caused by the driver, and a slight bending of the steering wheel above the longitudinal axis of the steering column with corresponding dimensioning of the spokes leads to a sharp bending of the steering wheel underneath the longitudinal axis. The plane of the steering wheel rim thereby no longer runs inclined relative to the driver but runs at least approximately parallel to the body. The airbag is thereby positioned during the load phase practically parallel to the thorax of the driver so that the thorax is also stressed simultaneously by the entire front surface of the airbag. The specific surface load stress, and thus the risk of injury to the driver through the airbag, is thus lower. The biomechanically correct positioning of the airbag is guaranteed in all cases and the airbag cannot be, at any point in time, pushed away from the driver. A further advantage is that energy is absorbed by the deforming steering wheel as well as by the airbag.

A further possibility for improving the protection of the driver is where an intermediate ring is provided on the steering wheel and is connected on one side by hub spokes to the steering wheel hub and on the other side by rim spokes to the steering wheel rim, whereby at least the hub spokes are deformable in the event of a crash. This division into hub spokes and rim spokes makes it possible to mount the hub and rim spokes at different places. In one embodiment, four symmetrically arranged hub spokes are provided having the same angular spacing from each other, and four symmetrically arranged rim spokes are provided. In the plan view of the steering wheel, and with the steering wheel in the straight position, the two lower rim spokes have at least approximately the same path as the hub spokes, and the other two rim spokes, that run in the upper steering wheel area, are flatter than the hub spokes.

The arrangement of the spokes at the same angular spacing is generally for reasons of strength and stability. Owing to the requisite view of the instruments on the instrument panel, such an arrangement is, however, not practical. However, by dividing the spokes into two, the same angular spacing is now possible in the hub part.

In a further embodiment, the intermediate ring and the deformation element are combined with each other. Thus it is proposed that the end of the deformation element that points towards the steering wheel rim is associated with the intermediate ring, whereby the deformation element and the intermediate ring are in engagement with each other without contact. The end of the deformation element pointing towards the steering wheel rim preferably has the shape of a fork into which an edge of the intermediate ring engages.

The intermediate ring and the deformation element do not normally contact one another, i.e. during rotation of the steering wheel, the rotary mounted component part remains in the same position which it occupies when the steering wheel is straight. Only in the event of a crash is the intermediate ring pressed against the deformation part resulting in the deformation of the deformation part.

It is expedient if the hub spokes extend between the steering wheel hub and the intermediate ring in the form of an L-shaped angle.

In a further embodiment of the invention, it is proposed that the airbag module is fixed on the rotary mounted component part or the weight. This arrangement allows an impact surface of the airbag deviating from the circular shape, as is known for passenger airbags, because the airbag module, when fitted onto the rotary mounted component part or on the weight connected to the rotary mounted component part, does not rotate with the steering wheel. Thus, the airbag can now, like the passenger airbag, retain a shape which offers greater protection than an airbag with circular impact surface.

The rotary mounted component part is preferably mounted in a rolling bearing in order to ensure easy mobility. Furthermore, it is expedient if the rotary mounted component part has at least one claw which engages under a ring-shaped projection of the steering wheel hub. These claws are to provide the rotary mounted component part with an additional hold during deformation of the deformation element in the event of a crash.

With a further design, the steering wheel hub consists of a lower and upper part between which the hub spokes are fixed.

In a further embodiment, it is proposed that the section of the bearing connected to the steering wheel hub for the rotary mounted component part is connected by at least one spring element to the steering wheel hub or that the weight is connected by at least one spring element to the rotary mounted component part. Disturbing vibrations of the steering wheel are thereby compensated by resiliently connecting together the rotary mounted component part with the hub part and with the weight. The additional weight, connected resiliently to the steering wheel and provided for compensating the vibrations in the case of known steering wheels, can thereby be omitted.

BRIEF DESCRIPTION OF THE DRAWINGS

The invention will now be explained in further detail with reference to the drawings in which.

DETAILED DESCRIPTION OF THE PREFERRED EMBODIMENT

Figure 1:
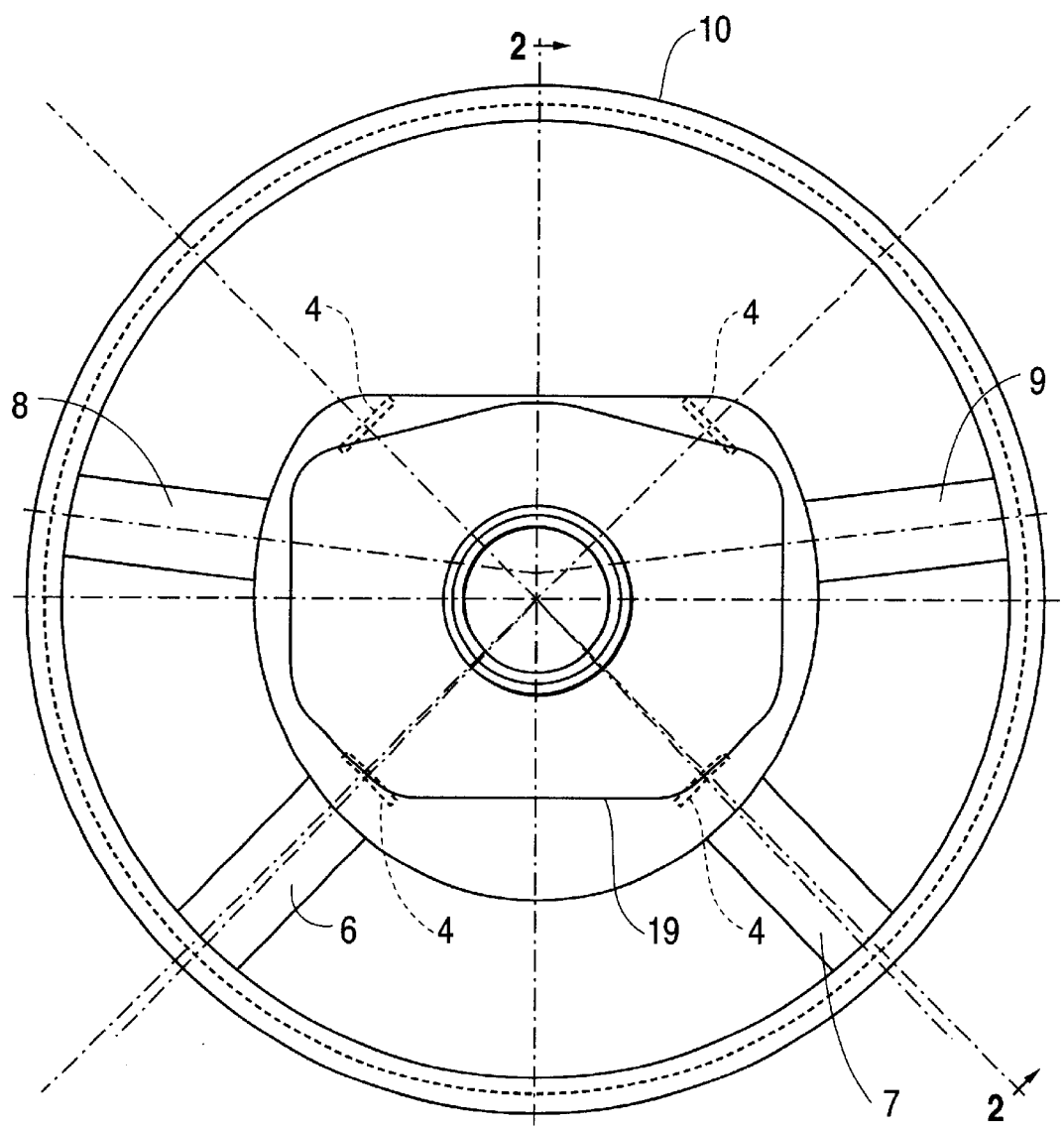
FIG. 1 shows a plan view of a steering wheel.

The illustrated steering wheel has a steering wheel hub which consists of a lower hub part 1 and an upper hub part 2 which are connected together by counter-sunk screws 3. Four hub spokes 4, which engage between the two hub parts, are first inserted in recesses of the lower hub part 1 and then clamped when the hub parts are fitted together. The hub spokes are then welded to the hub. The hub spokes are arranged at an angular spacing of 90° relative to each other and, as can be seen from FIG. 2, have approximately the shape of an L-angle. The hub spokes support an intermediate ring 5 at their upper end. Four rim spokes 6 to 9 are fixed on this intermediate ring and support a steering wheel rim 10. The lower rim spokes 6 and 7 which are also called stomach rim spokes thereby run in the direction of the lower hub spokes 4. The upper rim spokes 8 and 9 which are also called chest rim spokes run flatter, however, than the upper hub spokes 4 so that a clear vision to the dashboard panel is thereby ensured, as can be seen in FIG. 1.

A rotary plate 11, which is mounted on a rolling bearing 12, is provided on the steering wheel hub as a rotary mounted component part. The bearing preferably sits with a pressed fit on the rotary plate and is connected to the upper hub part 2 by a bearing ring 13 and screws 14.

Figure 2:
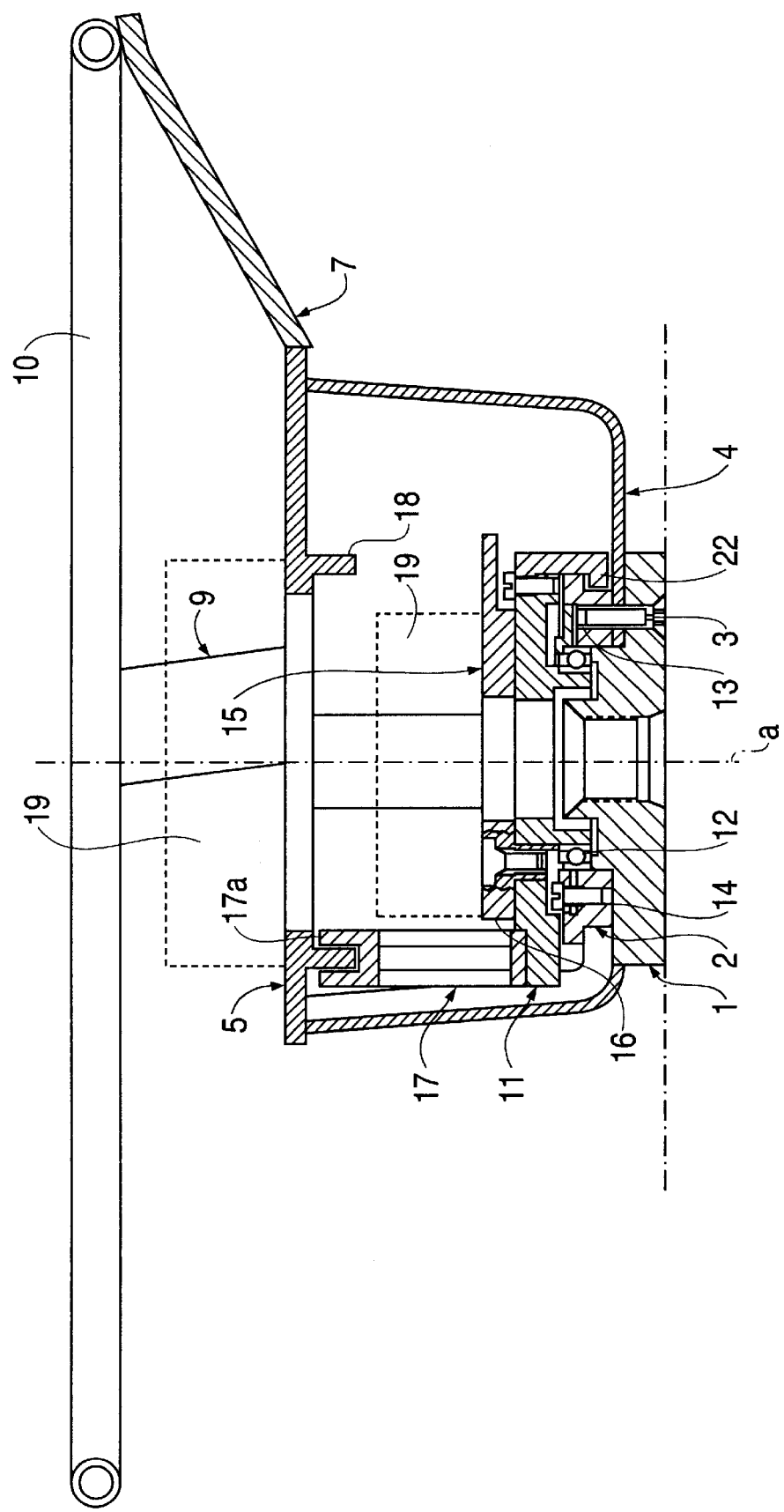
FIG. 2 shows a sectional view through the steering wheel of FIG. 1 in the direction of the arrows A—A.
Figure 4:
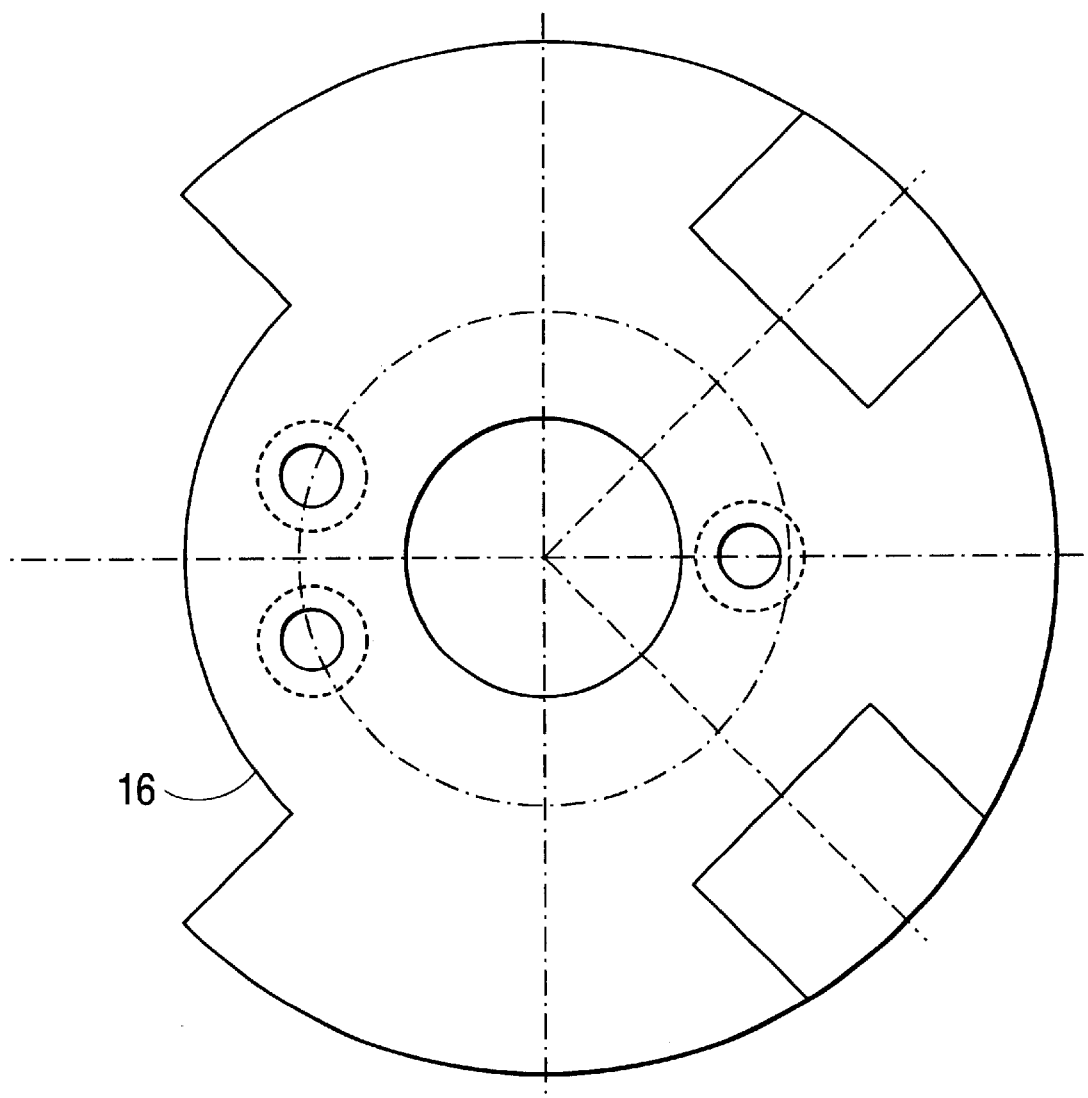
FIG. 4 shows a view from below a weight fixed on the rotary plate.

A plate-like weight 15 is fixed on the rotary plate 11 and the center of gravity of the weight is outside of a rotary axis of the rotary plate. This is achieved in the present case in that the weight 15 has a section 16 of smaller diameter, as can be seen from FIG. 4. The side shown on the right in FIG. 2 represents the lower part of the steering wheel. The weight and, thus, the rotary plate remain in this position even during rotation of the steering wheel.

A deformation element 17 is fixed on the rotary plate 11 on the side of the steering wheel, as shown in FIG. 2 on the left side which represents the upper part of the steering wheel. The deformation element extends from the rotary plate in the direction of the intermediate ring 5. The end of the deformation element, which extends along the intermediate ring 5, has the shape of a fork 17a in which a ring-shaped edge 18 of the intermediate ring 5 extends. However, the intermediate ring does not contact the deformation element. Irrespective of the rotation of the steering wheel with the intermediate plate 5, the deformation element remains in its illustrated position above a longitudinal axis a of the steering spindle. In order to provide the rotary plate 11 with sufficient hold during deformation of the deformation element 17, two claws 22 are fixed additionally on the rotary plate 11 and engage under the outer edge of the upper hub part 2. Only one claw can be seen in FIG. 2.

In the event of a crash, the edge 18 of the intermediate ring 5 is pressed against the deformation element 17 whereby the deformation element is deformed a certain amount in the direction of the rotary plate 11. As was discovered from experiments, after a certain deformation of the deformation element 17, the lower area of the steering wheel shown on the right in FIG. 2, is pressed in through deformation of the lower hub spokes 4. The plane of the steering wheel rim 10 is thus turned at least approximately parallel to the body of the driver.

An airbag module 19 can be fixedly connected in a known way to the steering wheel by mounting the airbag module on the intermediate ring 5. In this case it co-rotates during rotation of the steering wheel. However, the airbag module can also be fixed on the weight 15, and thus on the rotary plate 11, so that during rotation of the steering wheel the airbag module remains fixed in position. With the previously mentioned design, the shape of the airbag can deviate from the conventional circular round shape of the airbag and the protection for the driver is thereby optimized.

Figure 3:
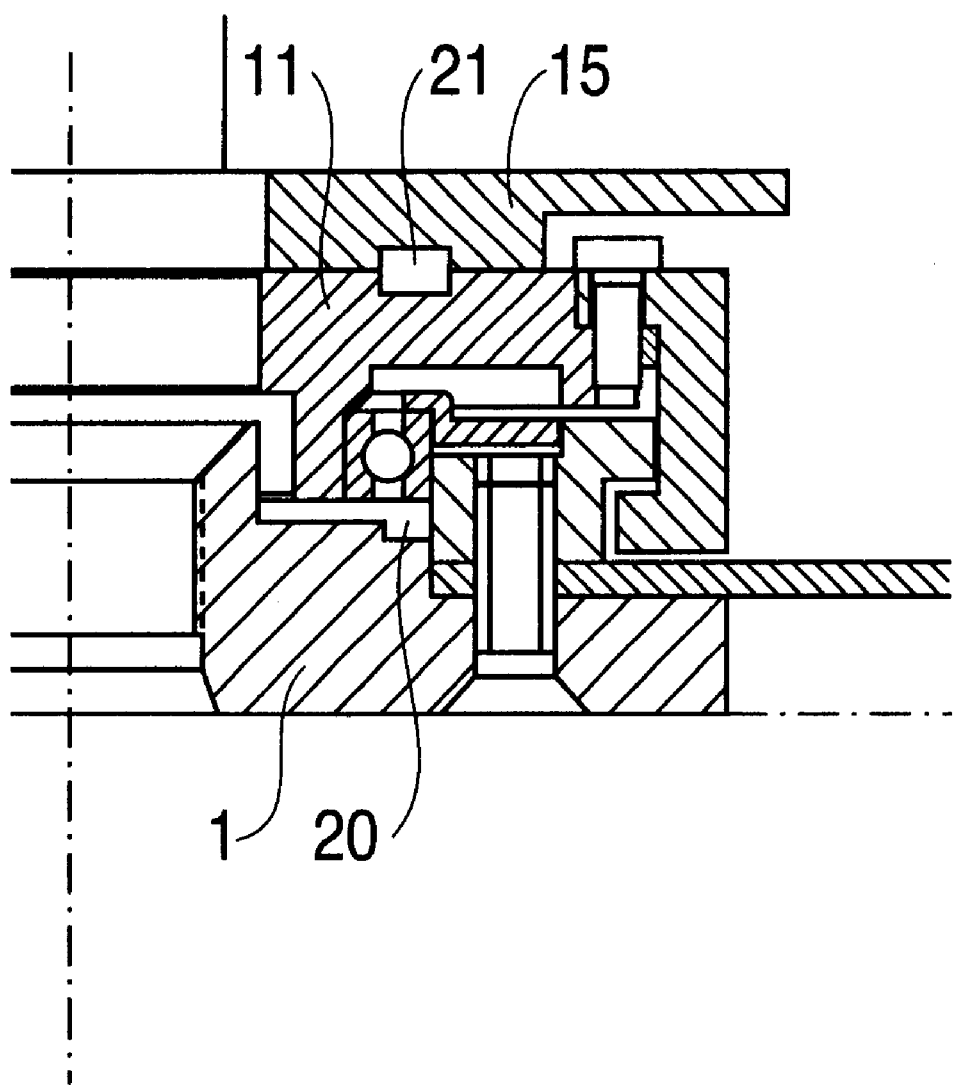
FIG. 3 shows a section of the bearing of a rotary plate using resilient elements.

In the embodiment of FIG. 2, the rotary plate is connected rigidly to the hub and weight. However, in the embodiment of FIG. 3 the connection between the rotary plate 11 and the lower hub part 1 and the weight 15 is through resilient elements 20 and 21, respectively. The rotary plate 11, which is present in any case, is thus used at the same time as an additional weight for compensating the vibrations which appear on the steering wheel. Further, additional weights, such as are used in the case of conventional steering wheels for compensating vibrations, are therefore superfluous.

What is claimed is:

1. A steering wheel comprising a hub, spokes, a steering wheel rim, an airbag module, and a rotary mounted component part to hold at least a further subassembly, wherein the rotary mounted component part is one of fixed on the steering wheel hub and fixable in an associated steering column;

wherein a center of gravity of at least one of the component part and the further subassembly lies eccentric so that the rotary mounted component part, during rotation of the steering wheel, remains in a position that is the same as the position occupied when the steering wheel is straight;

wherein the rotary mounted component part has a rotary axis and a deformation element extending in the direction of the steering wheel rim; and wherein the deformation element is fixed on an area of the component part which lies above the rotary axis of the component part when the steering wheel is attached to a steering column .

2. The steering wheel according to claim 1 wherein the rotary axis of the rotary mounted component part coincides with a longitudinal axis of the steering column holding the steering wheel.

3. The steering wheel according to claim 1 wherein a weight mounted on the rotary mounted component part and the center of gravity of the weight lies outside the rotary axis.

4. The steering wheel according to claim 3 wherein the rotary mounted component part and the weight are plate-shaped.

5. The steering wheel according to claim 1, wherein the deformation element, in the event of a crash, is deformable away from the driver through a part of the steering wheel.

6. The steering wheel according to claim 1 further comprising an intermediate ring;

wherein the spokes include rim spokes and hub spokes;

wherein the intermediate ring is connected on one side through the hub spokes to the steering wheel hub and on the other side through the rim spokes to the steering wheel rim; and wherein at least lower hub spokes are deformable in the event of a crash.

7. The steering wheel according to claim 5 wherein the deformation element has an end pointing in the direction of the steering wheel rim and the deformation element is associated with the intermediate ring wherein the deformation element and the intermediate ring are radially fixed relative to each other without contact.

8. The steering wheel according to claim 7 wherein the intermediate ring has an edge, wherein the end of the deformation element pointing in the direction of the steering wheel rim has the shape of a fork in which the edge of the intermediate ring engages.

9. The steering wheel according to claim 1 wherein the steering rim has a lower area and an upper area;

wherein the spokes include four symmetrically arranged hub spokes having the same angular spacing from each other, and four symmetrically arranged rim spokes with two rim spokes at the lower area of the steering rim and two rim spokes at the upper area of the steering rim;

wherein in a plan view of the steering wheel and with the steering wheel in the straight position, the two rim spokes of the lower area of the steering rim have at least approximately the same path as two of the four symmetrically arranged hub spokes and the two rim spokes of the upper area of the steering wheel run flatter than the other two of the four symmetrically arranged hub spokes.

10. The steering wheel according to claim 6 wherein the hub spokes between the steering wheel hub and the intermediate ring extend in the form of an L-shaped angle.

11. The steering wheel according to claim 3 wherein the airbag module is fixed on one of the rotary mounted component part and the weight.

12. The steering wheel according to claim 1 wherein the rotary mounted component part is mounted in a rolling bearing.

13. The steering wheel according to claim 1 wherein the steering wheel hub has a ring-shaped projection, wherein the rotary mounted component part has at least one claw which engages under the ring-shaped projection of the steering wheel hub.

14. The steering wheel according to claim 1 wherein the spokes include hub spokes and the steering wheel hub consists of a lower and an upper part between which the hub spokes are fixed.

15. The steering wheel according to claim 12 wherein the bearing for the rotary mounted component part is connected to the steering wheel hub through at least one resilient element.

16. The steering wheel according to claim 3 wherein the weight is connected to the rotary mounted component part through at least one resilient element.

17. A steering wheel comprising a hub, spokes, a steering wheel rim, an airbag module, a rotary mounted first component part to hold at least a further subassembly, wherein the rotary mounted component part is one of fixed on the steering wheel hub and fixable in an associated steering column;

wherein a center of gravity of at least one of the rotary mounted first component part and the further subassembly lies eccentric so that the rotary mounted component part, during rotation of the steering wheel, remains in a position that is the same as the position occupied when the steering wheel is straight;

wherein the rotary mounted first component part has a rotary axis and a deformation element extending only from one side of the rotary axis in the direction of the steering wheel rim;

wherein the deformation element is fixed on an area of the rotary mounted first component part which lies above the rotary axis of the rotary mounted first component part when the steering wheel is attached to a steering column.

18. A steering wheel comprising a hub, spokes, a steering wheel rim, an airbag module, a rotary mounted first component part to hold at least a further subassembly, wherein the rotary mounted component part is one of fixed on the steering wheel hub and fixable in an associated steering column;

wherein a center of gravity of at least one of the rotary mounted first component part and the further subassembly lies eccentric so that the rotary mounted component part, during rotation of the steering wheel, remains in a position that is the same as the position occupied when the steering wheel is straight;

wherein the rotary mounted first component part has a rotary axis and a deformation element extending in the direction of the steering wheel rim toward a second component part;

wherein the deformation element is fixed on an area of the rotary mounted first component part which lies above the rotary axis of the rotary mounted first component part when the steering wheel is attached to a steering column; and the second component part and the deformation element are arranged in a position such that in the event of impact, the second component part presses against the deformation element.

19. The steering wheel of claim 18 wherein the second component part is fixed relative to the steering wheel rim during rotation of the steering wheel rim.

* * * * *